United States Patent
Aritake et al.

(10) Patent No.: US 8,205,391 B2
(45) Date of Patent: Jun. 26, 2012

(54) AUTOMOBILE WEATHER STRIP

(75) Inventors: Masanori Aritake, Aichi-ken (JP);
Norimasa Iwasa, Aichi-ken (JP);
Satoshi Toki, Aichi-ken (JP); Takaaki Sakai, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 487 days.

(21) Appl. No.: 12/232,617

(22) Filed: Sep. 19, 2008

(65) Prior Publication Data

US 2009/0120007 A1    May 14, 2009

(30) Foreign Application Priority Data

Sep. 20, 2007 (JP) ................ P2007-243653
Sep. 12, 2008 (JP) ................ P2008-234937

(51) Int. Cl.
*E06B 7/22* (2006.01)

(52) U.S. Cl. ............... 49/498.1; 49/490.1; 49/475.1

(58) Field of Classification Search ......... 49/490.1, 49/495.1, 498.1, 475.1; 428/122, 304.4, 428/316.6
See application file for complete search history.

(56) References Cited

U.S. PATENT DOCUMENTS

| | | | |
|---|---|---|---|
| 3,806,558 A * | 4/1974 | Fischer | 525/198 |
| 5,343,609 A | 9/1994 | McManus | |
| 5,973,017 A | 10/1999 | Okita et al. | |
| 6,023,888 A * | 2/2000 | Dover | 49/441 |
| 6,040,351 A | 3/2000 | Okita et al. | |
| 6,132,847 A | 10/2000 | Okita et al. | |
| 6,395,371 B1 | 5/2002 | Nozaki et al. | |
| 6,571,514 B1 | 6/2003 | Aritake | |
| 6,601,346 B2 * | 8/2003 | Nozaki | 49/498.1 |
| 6,652,952 B2 * | 11/2003 | Drozd et al. | 428/122 |
| 6,686,020 B2 * | 2/2004 | Sakuma | 428/122 |
| 7,318,613 B2 * | 1/2008 | Hiroe et al. | 296/1.08 |
| 7,356,967 B2 * | 4/2008 | Zwolinski et al. | 49/440 |
| 2001/0021449 A1 | 9/2001 | Koshiba et al. | |
| 2003/0188491 A1 * | 10/2003 | Aritake | 49/490.1 |
| 2005/0080150 A1 * | 4/2005 | Nakahama et al. | 521/50 |

(Continued)

FOREIGN PATENT DOCUMENTS

CN    1810531 A    8/2006

(Continued)

OTHER PUBLICATIONS

Japan Industrial Standard JIS K 6254 (with partial translation). 2010.*

(Continued)

*Primary Examiner* — Katherine W Mitchell
*Assistant Examiner* — Catherine A Kelly
(74) *Attorney, Agent, or Firm* — McGinn IP Law Group, PLLC

(57) ABSTRACT

An automobile weather strip has a trim part having a substantially U-shaped section and a sealing part. The automobile weather strip is characterized in that: the trim part has an insert member and a covering material for covering the insert member; the covering member is provided with holding lips for holding a flange part on an inner surface of the trim part; a sponge material of a rubber formed by using a blend material of an EPDM rubber and an olefin-based thermoplastic synthetic resin and a sponge material of a rubber having physical properties of a specific gravity of 0.6 to 0.8 and a 25%-stretching stress of 500 KPa or more are used as the covering material.

9 Claims, 2 Drawing Sheets

U.S. PATENT DOCUMENTS

| | | |
|---|---|---|
| 2005/0081450 A1 | 4/2005 | Zwolinski et al. |
| 2005/0184415 A1 | 8/2005 | Ohashi |
| 2005/0246963 A1* | 11/2005 | Kogiso et al. ............... 49/498.1 |
| 2006/0162257 A1 | 7/2006 | Nozaki et al. |
| 2007/0113482 A1* | 5/2007 | Dumke et al. ............... 49/498.1 |
| 2007/0169417 A1* | 7/2007 | Ellis et al. ................... 49/490.1 |
| 2007/0193120 A1* | 8/2007 | Tessier et al. ............... 49/490.1 |
| 2007/0237922 A1* | 10/2007 | Miyakawa et al. ........... 428/122 |

FOREIGN PATENT DOCUMENTS

| | | |
|---|---|---|
| EP | 0 837 098 A1 | 4/1998 |
| EP | 1 036 686 A2 | 9/2000 |
| EP | 1 072 380 A2 | 1/2001 |
| EP | 1 447 253 A1 | 8/2004 |
| JP | 57-153050 | 9/1982 |
| JP | 2000-264135 A | 9/1994 |
| JP | 10-204201 A | 8/1998 |
| JP | 10-338766 A | 12/1998 |
| JP | 11-193335 | 7/1999 |
| JP | 11-286568 A | 10/1999 |
| JP | 2000-264135 | 9/2000 |
| JP | 2001-310967 A | 11/2001 |
| JP | 2002-316537 | 10/2002 |
| JP | 2005-88809 | 4/2005 |
| JP | 2005-88809 A | 4/2005 |
| JP | 2005-219362 A | 8/2005 |
| JP | 2007-030557 A | 2/2007 |
| WO | 2005/037587 A1 | 4/2005 |

OTHER PUBLICATIONS

Japan Industrial Standard JIS K 6301 (with partial translation). 1995.*

European Search Report dated Mar. 2, 2009.

Notice of Opposition in European Patent No. 2039553 dated Oct. 22, 2010.

Japan Industrial Standard JIS K 6254 (with partial English translation).

Chinese Office Action dated Jun. 30, 2010, with English translation.

"Analysis on Seal of Passat B5 by Use of Nonlinear Finite Element Software"; Feb. 10, 2005.

Information Offer Form on Prior Arts submitted to Japanese Patent Office dated Dec. 14, 2010.

Japan Industrial Standard JIS K 6301 (with partial English translation).

* cited by examiner

AUTOMOBILE WEATHER STRIP

BACKGROUND OF THE INVENTION

1. Field of the Invention

This invention relates to an automobile weather strip that is attached to a rim of an opening of a vehicle body of an automobile for sealing between the vehicle body opening rim and an opening open/close member. Particularly, this invention relates to an automobile weather strip having a trim part to be attached to a flange part formed on the vehicle body opening rim or the opening open/close member and a sealing part for contacting the opening open/close member or the vehicle body opening rim for sealing.

This invention will be described by taking as an example an opening trim weather strip that is attached to a flange part of a rim of an opening of a vehicle body and brought into contact with a door for sealing between the door and the vehicle body when the door of the automobile is closed.

2. Related Art

As shown in FIG. 4, an opening trim weather strip 110 attached to a vehicle body opening rim 6 of an automobile is molded by extrusion molding and formed of a trim part 120, a cover lip 130, and a hollow sealing part 140.

The trim part 120 has a substantially U-shaped section and holds a flange part 9 formed on the vehicle body opening rim 6 so that the opening trim weather strip 110 is attached to a whole periphery of a vehicle body opening. The trim part 120 has an insert member 126 that is embedded thereinside, and a vehicle exterior side holding lip 124 and a vehicle interior side holding lip 125 for holding the flange part 9 are formed on an inner surface of the substantially U-shaped section, so that the trim part is held at the flange part 9 of the vehicle body 1 by the holding lips 124 and 125.

The hollow sealing part 140 is integrally formed on an outer surface of a vehicle exterior side of the trim part 120, so that the hollow sealing part 140 contacts an outer periphery of the door 2 when the door is closed, thereby sealing between the door 2 and the vehicle body opening rim 6. The hollow sealing part 140 is formed from a sponge material in order that the hollow sealing part 140 flexibly contacts and reliably seals the door 2 in accordance with the shape of the door 2. In general, an EPDM sponge rubber having a specific gravity of 0.4 to 0.6 and a 25%-stretching stress of 140 to 190 KPa has been used as this sponge material in view of flexibility, resistance weather, strechability, and rigidity. When the specific gravity is less than 0.4, a predetermined rigidity (25%-stretching stress) is not achieved to make it difficult to achieve a sealing pressure when the door is closed and to raise the risk of unnecessary deformation when attached as being curved along a corner part of the vehicle body opening rim 6. In turn, when the specific gravity is more than 0.6, the rigidity is increased to cause a drawback of an increase in door closing force.

The cover lip 130 is extended in a vehicle interior side direction from an outer surface of a vehicle interior side of the trim part 120 and contacts a garnish or the like provided on a car interior to cover a gap between the opening trim weather strip 110 and the garnish and the vehicle body. A surface layer 133 made from a thermoplastic elastomer which is a solid material is provided on a surface of the cover lip 130 for decoration purpose.

In such opening trim weather strip 110, the trim part 120 has the insert member 126 that is embedded thereinside and the vehicle exterior side holding lip 124 and the vehicle interior side holding lip 125 in order to reliably hold the flange part 9, and the solid material of an EPDM rubber has been used as a material for covering the insert member 126. The solid material of the EPDM rubber has a specific gravity of about 1.2 to about 1.3 and a 25%-stretching stress of 800 KPa or more, thereby achieving a sufficient rigidity. Therefore, the trim part 120 made from the solid material of the EPDM rubber holds the flange part 9 with the vehicle exterior side holding lip 124 and the vehicle interior side holding lip 125 to stably maintain the attachment posture.

However, due to the recent global environment protection, there is a demand for a weight reduction of automobiles, and, since a weight reduction in the opening trim weather strip 110 and the like has been required, the reduction has been achieved by finely foaming the solid material (see JP-U-57-153050, JP-A-11-193335, JP-A-2000-264135 and JP-A-2002-316537, for example).

However, the finely foamed solid material has a specific gravity of about 0.8 to about 1.05, which is insufficient for the weight reduction purpose when compared with the specific gravity (about 0.4 to 0.6) of ordinary sponge materials. The fine foaming was adopted since rigidity of the vehicle exterior side holding lip 124 and the vehicle interior side holding lip 125 are reduced too much (25%-stretching stress of 140 to 190 KPa) when a foaming ratio of the material used as the covering material is increased from the solid material (specific gravity: 1.2 to 1.3) to the ordinary sponge materials (specific gravity: 0.4 to 0.6) to make the trim part 120 to subject to falling from the flange part 9 due to a reduction in falling load caused by a reduction in holding force by the vehicle exterior side holding lip 124 and the vehicle interior side holding lip 125 when the trim part 120 is attached to the flange part 9 at an upper side of the door opening rim, and since there is the risk of failing to ensure the sealing property due to displacement of the hollow sealing part 140 that can be caused by inclination of the trim part 120 occurring when attaching the opening trim weather strip 110 while bending the opening trim weather strip 110 along the corner part of the door opening rim.

In order to ensure the rigidity of the vehicle exterior side holding lip 124 and the vehicle interior side holding lip 125, a thickness of the vehicle exterior side holding lip 124 and the vehicle interior side holding lip 125 may be increased. However, there is a limit for the increase in thickness since an inner part of the substantially U-shaped section of the trim part 120 is narrow. In the case of forming the vehicle exterior side holding lip 124 and the vehicle interior side holding lip 125 from the ordinary sponge material, it is necessary to increase the thickness (about 1.0 to 1.5 mm) to a thickness that is twice the thickness or more in order to attain rigidity equivalent to the solid material or the finely foamed material, and such thickness increase has not been practical.

Also, a 25%-stretching stress achieved by keeping the thickness of the vehicle exterior side holding lip 124 and the vehicle interior side holding lip 125 to that of the conventional example and adjusting the specific gravity to 0.6 to 0.8 by adding a larger amount of a foaming agent to the finely foamed material is 200 KPa to 350 KPa which is equal to or less than a half of the specific gravity (0.8 to 1.05) of the conventional finely foamed material, thereby failing to exhibit the function as the trim part 120.

As described above, since the solid material forming the trim part 120 has the specific gravity of about 1.2, and since the finely foamed material has the specific gravity of about 0.8 to about 1.05, there is a demand for a reduction in specific gravity (to about 0.5 to about 0.8) by further foaming the materials.

However, though the reduction in specific gravity that is achieved by further foaming the finely foamed martial as described above is preferable in terms of the demand for lightweight, the rigidity is undesirably reduced to prevent the function of the trim part 120 serving as an attachment part from being exhibited.

Therefore, there has been a demand for an automobile weather strip that is further reduced in weight; ensures rigidity without a major change in outer shape of the vehicle exterior side holding lip 124 and the vehicle interior side holding lip 125; hardly or never comes off from the flange part 9; is capable of maintaining an attachment posture of the trim part; and is produced easily at a low cost.

In order to solve the above-described problems, the first aspect of the invention provides an automobile weather strip to be attached to a rim of an opening of a vehicle body of an automobile for sealing between the vehicle body opening rim and an opening open/close member, comprising: a trim part holding the weather strip as being attached to a flange part of the vehicle body opening rim or the opening open/close member and having a substantially U-shaped section and a sealing part formed integrally with an outer surface of the trim part and sealing as contacting the opening open/close member or the opening rim, wherein the trim part comprises an insert member and a covering material for covering the insert member and forms on an inner surface of the substantially U-shaped section a holding lip for holding the flange part;

the covering member is formed by using a sponge material of a rubber formed by using a blend material of an EPDM rubber and an olefin-based thermoplastic synthetic resin and having physical properties of a specific gravity of 0.6 to 0.8 and a 25%-stretching stress of 500 KPa or more; and the sealing part is formed by using a sponge material of a rubber formed by using the EPDM rubber and not containing the olefin-based thermoplastic synthetic resin and having physical properties of a specific gravity of 0.4 to 0.6 and a 25%-stretching stress of 200 KPa or less.

According to the first aspect of the invention, the automobile weather strip has a trim part holding the weather strip as being attached to a flange part of a vehicle body opening rim or an opening open/close member and having a substantially U-shaped section and a sealing part formed integrally with an outer surface of the trim part as projecting from the outer surface and sealing as contacting the opening open/close member or the opening rim. Therefore, when the trim part is attached to the flange part of the vehicle body opening rim or the opening open/close member, the sealing part reliably contacts the opening open/close member or the vehicle body opening rim to seal between the vehicle body opening rim and the opening open/close member.

The trim part has an insert member inside thereof and a covering material for covering the insert member. Also, the covering member of the trim part forms on an inner surface of the substantially U-shaped section a holding lip for holding the flange part. Therefore, an outer shape of the trim part is maintained by the insert member, and a force of the vehicle body or the like for holding the flange part is increased, thereby achieving reliable attachment of the weather strip. Also, since the insert member is covered with the covering material, an appearance is improved, and the insert member is prevented from being corroded.

For the covering member, a sponge material of a rubber obtained by using a blend material of an EPDM rubber and an olefin-based thermoplastic synthetic resin and having physical properties of a specific gravity of 0.6 to 0.8 and a 25%-stretching stress of 500 KPa or more is used. Therefore, it is possible to reduce a weight of the trim part of the weather strip, and the holding lip formed on the inner surface of the substantially U-shaped section of the trim part has sufficient rigidity to increase a falling load of the trim part, thereby making it possible for the trim part to reliably hold the flange part.

The sponge material of the rubber is the blend material of the EPDM rubber and the olefin-based thermoplastic synthetic resin, and the rigidity is improved by blending the olefin-based thermoplastic synthetic resin and/or increasing a crosslink density of the EPDM rubber. Therefore, it is possible to maintain the shape without largely changing the outer shape of the holding lip as well as to keep sufficient rigidity for holding the flange part.

It is possible to adjust elasticity and rigidity by adjusting a blending ratio of the olefin-based thermoplastic synthetic resin. Therefore, the holding lip has an appropriate flexibility (elasticity) and is capable of maintaining a holding force by a flexure of the holding lip even when a thickness of the flange is changed as well as of reliably holding the flange part in response to unevenness and bending of the flange part.

The sealing part is formed by using a sponge material of a rubber obtained by using the EPDM rubber free from the olefin-based thermoplastic synthetic resin and having physical properties of a specific gravity of 0.4 to 0.6 and a 25%-stretching stress of 200 KPa or less. Therefore, the weight of the sealing part is reduced, thereby making it possible to reduce the weight of the weather strip as a whole.

Also, since the sponge material having the physical property of 25%-stretching stress of 200 KPa or less, the sealing part is excellent in flexibility, so that the sealing part is capable of reliable sealing as being deformed in accordance with the shape of a counter member when the sealing part contacts the counter member as well as of suppressing an increase in door closing force.

The second aspect of the invention provides the automobile weather strip, wherein the trim part comprises a cover lip that is formed integrally with the outer surface of the trim part as extending toward a vehicle interior side; and the cover lip is formed from the sponge material of the rubber that is the blend material of the EPDM rubber and the olefin-based thermoplastic synthetic resin.

According to the second aspect of the invention, since the cover lip is integrally formed with the trim part, and since the sponge material of the rubber that is the blend material of the EPDM rubber and the olefin-based thermoplastic resin and same as that used for the covering material of the trim part is used as a material for forming the cover lip, the cover lip covers between the weather strip and an interior member or a garnish and the like of the vehicle body to improve an appearance.

Also, since the cover lip is formed by the sponge material of the rubber, a weight of a part of the cover lip is reduced to contribute to the reduction in weight of automobile.

Further, since the sponge material of the rubber is the blend material of the EPDM rubber and the olefin-based thermoplastic resin that is the same as that used for the covering material, it is possible to improve rigidity by blending the synthetic resin and/or increasing a crosslink density of the EPDM rubber, and it is possible to adjust elasticity and rigidity by adjusting a blending ratio. Therefore, though the cover lip has the shape of the lip, the cover lip maintains the shape as well as to keep a sufficient contact force in contacting a counter member such as the garnish.

The third aspect of the invention provides an automobile weather strip wherein the sealing part has a hollow shape.

According to the third aspect of the invention, since the sealing part has a hollow shape, the sealing part is easily deformed as contacting the door that is the opening open/close member or the vehicle body opening rim when closing the door and reliably contacts unevenness and a curved surface of the door and the vehicle body opening rim. Also, the sealing part is not abnormally deformed when the door is closed as compared to those having a lip-like shape and capable of sealing even when there is a dimensional fluctuation in the vehicle body or the door.

The fourth aspect of the invention provides an automobile weather strip wherein outer surfaces of the sealing part and an outer surface of the cover lip are covered with a solid material.

According to the fourth aspect of the invention, since the sealing part and the outer surface of the cover lip are covered with the solid material, a surface is smooth, and appearance is improved. Since the sealing part has an inner part that is formed from the sponge material of the rubber having physical properties of a specific gravity of 0.4 to 0.6 and a 25%-stretching stress of 200 KPa or less, a weight of the sealing part is reduced, thereby making it possible to reduce the weight of the weather strip as a whole. However, since the inner part is formed from the sponge material, unevenness caused by foaming is caused on its outer surface. In order to diminish the unevenness and to improve wear resistance of the surface, the sealing part is covered with the solid material. Likewise, since an inner part of the cover lip is formed from the sponge material, unevenness caused by foaming occurs on its outer surface. In order to diminish the unevenness and to improve wear resistance of the surface, the cover lip is covered with a solid material of a thermoplastic elastomer.

Since the covering material forms on the inner surface of the substantially U-shaped section of the trim part the holding lip holding the flange part, the flange part is reliably held by the holding lip, and it is possible to reliably hold the flange part in response to unevenness and bending of the flange part.

Since the blend material of the EPDM rubber and the olefin-based thermoplastic synthetic resin is used as the covering material, and since the sponge material having physical properties of a specific gravity of 0.6 to 0.8 and a 25%-stretching stress of 500 KPa or more is used, it is possible to reduce the weight of the trim part of the weather strip as well as to maintain the sufficient rigidity of the holding lip, thereby making it possible to reliably hold the flange part with the trim part.

DETAILED DESCRIPTION OF THE PREFERRED EMBODIMENTS

Embodiments of this invention will be described by taking an opening trim weather strip as an example and based on FIGS. 1 to 3. This invention is applicable to a roof weather strip having a trim part serving as an attachment part having a substantially U-shaped section, a door weather strip, a back door weather strip, a luggage weather strip, and the like in addition to the opening trim weather strip 10.

Figure 1:
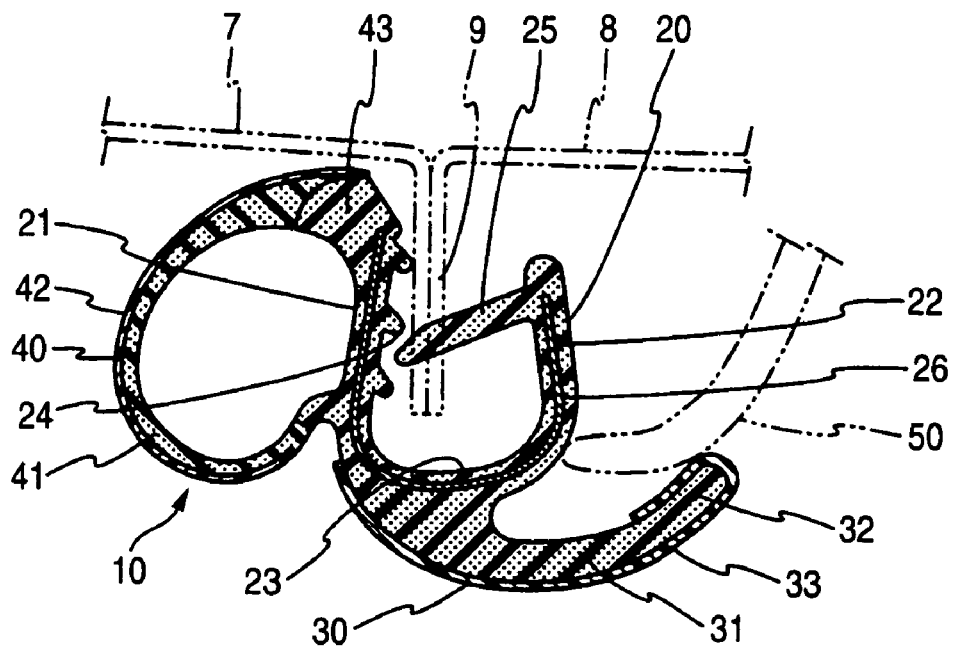
FIG. 1 is a diagram showing a sectional shape of an opening trim weather strip according to the first embodiment of this invention.

FIG. 1 is a sectional view showing the opening trim weather strip 10 according to the first embodiment of this invention. FIG. 2 is a perspective view showing an automobile as viewed from a rear of the automobile in a state where a door 2 is opened. FIG. 3 is a conceptual diagram showing a process for producing the opening trim weather strip 10 of this invention by extrusion molding. Shown in Table 1 are blended materials and physical properties of covering materials.

Figure 2:
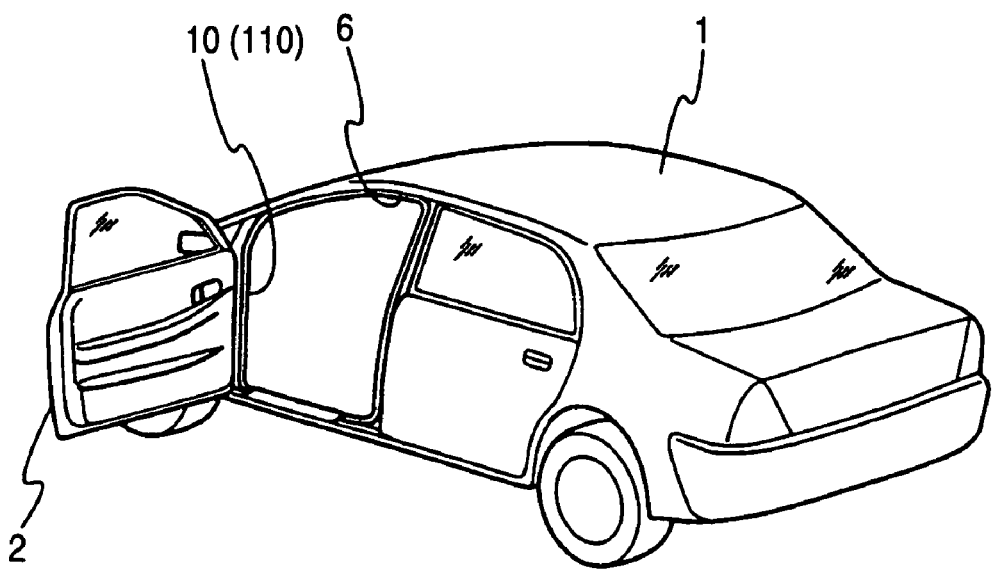
FIG. 2 is a perspective view showing an automobile as viewed from a rear of the automobile in a state where a door is opened.

As shown in FIG. 2, the opening trim weather strip 10 of this invention is attached in the form of a ring over a whole periphery of a flange 9 that is formed on a vehicle body opening rim 6 of an opening of a vehicle body that is opened/closed by the door 2 serving as an opening open/close member.

FIG. 1 is a sectional view showing the opening trim weather strip 10 according to the first embodiment of this invention. The opening trim weather strip 10 is formed of a trim part 20 serving as an attachment part, a cover lip 30, and a hollow sealing part 40. As described later in this specification, a surface layer 33 is provided on an upper surface of the cover lip 30.

The trim part 20 has a substantially U-shaped section formed of a vehicle exterior side wall 21, vehicle interior side wall, 22, and a bottom wall 23, and an insert member 26 is embedded inside the trim part 20. Also, the trim part 20 is provided with the cover lip 30 extending from an outer surface of the bottom wall 23 toward an automobile interior. As shown in FIG. 1, a plurality of vehicle exterior side holding lips 24 and a vehicle interior side holding lip 25 are provided on an inner surface of the substantially U-shaped section of the trim part 20.

The flange part 9 of the vehicle body opening rim 6 is inserted into an inner part of the substantially U-shaped section of the trim part 20 to be held by the vehicle exterior side holding lips 24 and the vehicle interior side holding lip 25, so that the opening trim weather strip 10 is attached to the flange part 9. Therefore, the trim part 20 acts as the attachment part.

The vehicle exterior side holding lips 24 consist of 3 short lips in this embodiment and formed continuously in a longitudinal direction on an inner surface of the vehicle exterior side wall 21 of the trim part 20. The vehicle exterior side holding lips 24 contact a lateral surface of the flange part 9 to hold the vehicle exterior side wall 21 in parallel to the flange part 9. Therefore, the hollow sealing part 40 formed on an outer surface of the vehicle exterior side wall 21 of the trim part 20 reliably contacts the door 2 which is a counter member to ensure a sealing property between the door 2 and the vehicle body opening rim 6.

The vehicle interior side holding lip 25 is formed as a lip that is longer than the vehicle exterior side holding lips 24. Since the lip is longer, the vehicle interior side holding lip 25 is easily brought into flexure while maintaining appropriate rigidity when a thickness of the flange part 9 is changed, thereby reliably holding the flange part 9. Also, an insertion force is diminished by the vehicle interior side holding lip 25 when inserting the flange part 9, while the vehicle interior side holding lip 25 prevents the trim part 20 from coming off by clinging to the flange part 9 due to its flexibility when the vehicle interior side holding lip 25 is coming off from the flange part 9.

As a covering material of the trim part 20, a sponge material of a rubber containing a sulfur crosslinked EPDM rubber having physical properties of a specific gravity of 0.6 to 0.8 and a 25%-stretching stress of 500 KPa or more as a main component and obtained by blending with an olefin-based thermoplastic resin is used.

As used herein, the term "25%-stretching stress" means a static elastic modulus measured in a small modification of a vulcanized rubber, which is defined by JIS K6254.

In the above-described sponge material of the rubber, 12 to 20 parts by weight of the olefin-based thermoplastic resin is blended with respect to 100 parts by weight of the EPDM rubber. When the blended amount of the olefin-based thermoplastic resin is less than 12 parts by weight, it is difficult to keep the 25%-stretching stress to 500 KPa or more, and it is necessary to increase the crosslink density by using a special EPDM rubber in which a content of diene (double bonding part) in the EPDM rubber is considerably increased as compared to an ordinary content in place of the blending of the olefin-based thermoplastic resin in order to keep the 25%-stretching stress to 500 KPa or more, resulting in an increase in production cost of the opening trim weather strip 10, which is not practical.

When more than 20 parts by weight of the olefin-based thermoplastic resin is blended, it is easy to raise the 25%-stretching stress to 500 KPa or more, but the trim part 20, the vehicle exterior side holding lips 24, and the vehicle interior side holding lip 25 are deteriorated in flexibility. Accordingly, when the opening, trim weather strip 10 is attached as being curved to a corner part of the vehicle body opening rim or the like, it is difficult to cause the trim part 20 to follow the curvature. Also, since an insertion load of the flange part 9 is increased when inserting the flange part 9 of the vehicle body, and, further, due to a force of returning to the linear shape that is the state when extrusion-molded, the trim part 20 is undesirably coming off from the flange part 9 at the corner part of the vehicle body opening rim.

As the olefin-based thermoplastic resin, those compatible with the EPDM rubber, such as a polyethylene resin, a polypropylene resin, and an ethylene/octane resin, may be used. The ethylene/octane resin was used in Examples 1 and 2 shown in Table 1.

too large to satisfy the reduction in weight. Therefore, Comparative Example 2 was prepared by adjusting the specific gravity to 0.7 by adding the increased amount of the foaming agent to the material of Comparative Example 1, but the rigidity (25%-stretching stress) is considerably reduced when the reduction in weight is achieved simply by increasing the foaming ratio. In contrast, in Example 1, rigidity was improved by increasing a crosslink density of the rubber by increasing the diene amount in EPDM.

The sponge material of the rubber of Example 1 or Example 2 in Table 1 to be used as the covering material has the physical properties of the specific gravity that is kept within the range of from 0.6 to 0.6 (specific gravity of 0.7) and the 25%-stretching stress of 500 KPa or more (580 KPa, 530 KPa). Therefore, it is possible for the vehicle exterior side holding lips 24 and the vehicle interior side holding lip 25 to maintain sufficient rigidity and flexibility. Therefore, the trim part 20 reliably holds the flange part 9, and a falling load is increased to prevent the falling when the trim part 20 is coming off from the flange part 9.

Also, it is possible to keep the thickness of the vehicle exterior side holding lips 24 and the vehicle interior side holding lip 25 to an ordinary thickness of about 1.0 to about 1.5 mm in the case of forming the covering material from the sponge material of the rubber. Therefore, an increase in load is prevented when inserting the flange 9 into the inner part of the substantially U-shaped section of the trim part 20.

Further, the insert member 26 is embedded into the inner part of the covering material of the trim part 20. Therefore, the shape of the substantially U-shaped section of the trim part 20 is kept as it is when the trim part 20 is formed from the sponge material, and, as a result, it is possible to ensure a satisfactory holding force for the flange part 9.

Also, since the covering material of the trim part 20 is formed from the sponge material of the rubber, it is possible

TABLE 1

|   | Ex. 1 | Ex. 2 | Comp. Ex. 1 (finely foamed material) | Comp. Ex. 2 (finely foamed material) | Com. Ex. 3 (sponge) | Comp. Ex. 4 (sponge) |
|---|---|---|---|---|---|---|
| EPDM | 100/280 | 100/280 | 100/441 | 100/443 | 100/323 | 100/322 |
| Amount of Diene in EPDM | 9 parts by weight | 4.5 parts by weight | 4.5 parts by weight | 4.5 parts by weight | 9 parts by weight | 9 parts by weight |
| Olefin-Based Thermoplastic Resin | 12/280 | 20/280 | 12/441 | 12/443 | | |
| Carbon Black (MAF) | 105/280 | 105/280 | 175/441 | 175/443 | 102/323 | 102/322 |
| Processed Oil (Paraffin-Based) | 35/280 | 35/280 | 98/441 | 98/443 | 70/323 | 70/322 |
| Sulfur | 2.0/280 | 2.0/280 | 1.8/441 | 1.8/443 | 3.0/323 | 3.0/322 |
| Foaming Agent | 2.5/280 | 2.5/280 | 0.65/441 | 3/443 | 3.0/323 | 2.0/322 |
| Specific Gravity | 0.7 | 0.69 | 1.05 | 0.7 | 0.55 | 0.7 |
| 25%-Stretching Stress | 580 KPa | 530 KPa | 760 KPa | 350 KPa | 160 KPa | 220 KPa |

As shown in Table 1, the sponge materials of the rubbers of Examples 1 and 2 are obtained by blending the ethylene/octane resin used as the olefin-based thermoplastic resin in the amount of 12 parts by weight and 20 parts by weight and increased in rigidity (25%-stretching stress) as compared to Comparative Examples 3 and 4 that do not contain the resin. Also, as to Comparative Example 1 which is the finely foamed material blended with the resin, the specific gravity is to reduce the weight, thereby contributing to a weight reduction of the opening trim weather strip 10.

As described in the foregoing, the cover lip 30 is integrally provided as extending in the vehicle interior direction in the form of a circular arc from the outer surface of the bottom wall 23 of the trim part 20, i.e. from a lower surface in FIG. 1. The cover lip 30 is formed close to the vehicle interior side as compared to the hollow sealing part 40 described later in this specification. A cover lip tip part 32 that is a tip part of the cover lip 30 contacts a garnish 50 attached to the vehicle interior side to cover a gap between the garnish 50 and the opening trim weather strip 10, thereby improving the appearance. At a part without the garnish 50 and the like, the cover lip tip part 32 contacts another interior member of the car interior, a ceiling liner material, and the like to cover the gap.

The cover lip 30 is formed of a cover lip main body 31 and a surface layer 33 covering the cover lip main body 31. The cove lip main body 31 is integrally formed from the material that is the same as the sponge material of the rubber of the covering material forming the trim part 20. Therefore, a weight of the cover lip 30 is reduced to contribute to the weight reduction of the opening trim weather strip 10. Also, since rigidity and flexibility of the cover lip 30 are increased, it is possible to easily bring the cover lip 30 into contact with the garnish 50 without a gap.

As to the reduction in weight, it is advantageous to use a sponge material of an ordinary EPDM rubber having a specific gravity of 0.4 to 0.6, which is used for the sealing part 40; however, since the cover lip 30 has the shape of the lip, the material having low specific gravity and low rigidity has the risk of failing to maintain the shape and the risk of failing to achieve a satisfactory contact force when contacting a counter member such as the garnish. Therefore, the sponge material having the medium specific gravity and high rigidity shown as Example 1 in Table 1 was used.

Since the sponge material is used for the trim part 20 and the cover lip main body 31, the medium specific gravity contributes to a large reduction in weights of the trim part 20 and the cover lip main body 31 as compared to the conventional finely foamed material, thereby largely reducing the weight of the opening trim weather strip 10.

The surface layer 33 is fixed to an outer surface of the bottom wall 23 of the trim part 20' and the upper surface (lower surface in FIG. 1) of the cover lip 30. The upper surface of the cover lip 30 can be seen from the vehicle interior side, but the trim part 20 and the cover lip 30 have unevenness on surfaces due to the sponge material having the specific gravity of 0.6 to 0.8. By forming the surface layer 33 from a solid material of a thermoplastic elastomer, it is possible to smooth the surfaces and to improve the appearance.

The solid material of the thermoplastic elastomer is used as the material for the surface layer 33 since it is possible to attach the solid material of the thermoplastic elastomer in the form of a sheet after vulcanization and foaming steps as described later, and, in the case where such post-attachment is difficult due to the shape, the surface layer 33 may be formed by simultaneous extrusion molding of the solid material of the rubber.

Also, it is necessary to change a surface pattern of the surface layer 33 in accordance with a color and glossiness of the interior of the automobile in terms of designing, and it is possible to use a surface layer 33 having a surface pattern that matches the interior.

The surface layer 33 entirely covers the cover lip tip part 32 of the cover lip main body 31 to reach an inner surface of the cover lip main body 31.

By forming the surface layer 33 from the solid material of the thermoplastic elastomer, it is possible to prevent generation of unevenness of bubbles and the like on the surface, and such surface layer 33 matches a emboss pattern of the surface of the garnish or the like, thereby achieving good appearance and ensuring transcription of the emboss pattern.

Further, due to the use of the thermoplastic elastomer, it is possible to pressure bond the surface layer 33 of the thermoplastic elastomer after the vulcanization and foaming of the sponge material in the case where other parts of the opening trim weather strip 10 are formed from the sponge material.

In the case where the cover lip main body 31 is formed by using a sponge material having an ordinary specific gravity of 0.4 to 0.6 and having 200 KPa or less, it is difficult to press bond the surface layer 33 of the thermoplastic elastomer by using a pressure roller after termination of vulcanization and foaming of the sponge material (rigidity of the sponge material is too low to enable roller pressure fixing). However, in the invention, the rigidity of the sponge material is high, the surface layer 33 can be pres bonded by using the pressure roller.

In the case where the cover lip main body 31 is formed form a material containing the EPDM rubber and the olefin-based thermoplastic resin, it is possible to use an olefin-based thermoplastic elastomer as the thermoplastic elastomer. In this case, the surface layer 33 is easily molten with the cover lip main body 31 to increase strength of welding between the cover lip main body 31 and the surface layer 33.

A weight ratio between a rubber component and a resin component of the olefin-based thermoplastic elastomer may preferably be 70:30 to 80:20. An EPDM rubber and an oil component are preferred as the rubber component, and a polypropylene resin or an olefin-based thermoplastic elastomer is preferred as the resin component.

The hollow sealing part 40 is formed integrally with the outer surface of the vehicle exterior side wall 21 of the trim part 20 in the vehicle exterior direction. The hollow sealing part 40 is formed of a hollow sealing part inner wall 41 and a hollow sealing part surface layer 42. The hollow sealing part inner wall 41 is integrally formed with a hollow sealing part base part 43 that is extended from the vehicle exterior side wall 21 of the trim part 20.

Except for the hollow sealing part base part 43, the hollow sealing part inner wall 41 of the hollow sealing part 40 is formed from a sponge material of a rubber formed of an EPDM rubber free from the olefin-based thermoplastic synthetic resin and having physical properties of a specific gravity of 0.4 to 0.6 and a 25%-stretching stress of 200 KPa or less.

Therefore, a weight of the hollow sealing part 40 is reduced to reduce total weight of the opening trim weather strip 10.

Also, since the hollow sealing part 40 is formed from the sponge material, the hollow sealing part 40 is excellent in flexibility and is deformed in accordance with unevenness of a door frame and the like of the door 2 and the shape of a curvature when contacting the door 2 that is the counter member to achieve reliable sealing as well as to reduce the closing force of the door 2.

The hollow sealing part base part 43 is not formed by using the sponge material of the rubber formed from the EPDM rubber not containing the olefin-based thermoplastic synthetic resin and having physical properties of a specific gravity of 0.4 to 0.6 and a 25%-stretching stress of 200 KPa or less in order to prevent the hollow sealing part 40 from being abnormally deformed and crushed due to insufficient rigidity when the hollow sealing part 40 is attached as being curved along the corner part of the vehicle body opening rim 6.

The hollow sealing part surface layer 42 may preferably be formed from an EPDM solid rubber material since the hollow sealing part 40 is provided with a curved part having a small curvature which makes attachment in the post-processing difficult. When the hollow sealing part 40 does not have the curved part having the small curvature or the like, it is possible to form the hollow sealing part 40 from the solid material of the thermoplastic elastomer like the surface layer 33.

In this case, when the hollow sealing part inner wall 41 is formed from the EPDM sponge rubber, it is preferable to use the olefin-based thermoplastic elastomer as the thermoplastic elastomer to strengthen the welding between the hollow sealing part inner wall 41 and the hollow sealing part surface layer 42.

Hereinafter, a production method for the opening trim weather strip 10 will be described. FIG. 3 is a schematic diagram showing a part of a production line of the opening trim weather strip 10.

In the opening trim weather strip 10, the trim part 20, the cover lip main body 31, and the hollow sealing part 40 are molded by an extrusion molding machine 61.

After supplying the insert member 26 to the extrusion molding machine 61, by using the blend material of the EPDM rubber and the olefin-based thermoplastic synthetic resin for the covering material of the trim part 20 and the cover lip 31 and by using the sponge material having physical properties of the specific gravity of 0.6 to 0.8 and the 25%-stretching stress of 500 KPa or more and the EPDM rubber for the hollow sealing part 40 that does not contain the olefin-based thermoplastic resin, the insert member 26 is extrusion-molded together with the sponge material having the physical properties of the specific gravity of 0.4 to 0.6 and the 25%-stretching stress of 200 KPa or less.

Also, in the case where the hollow sealing part surface layer 42 is the solid material of the rubber, the hollow sealing part surface layer 42 is formed by simultaneously extruding the solid material and the above-described sponge materials. After that, the integrally extruded material is conveyed to a radiofrequency heating furnace 62, a hot air heating furnace 63, and the like for heating, vulcanizing, and foaming.

After that, the heated and foamed integrally extruded material of the trim part 20 and the like is sent for an extrusion mold to which a nozzle of the extrusion molding machine 64 for extrusion molding the surface layer 33 of the cover lip 30 is attached. The cover layer 33 having a color corresponding to an interior of a vehicle is extruded in the form of a sheet on the heated and foamed integrally extruded cover lip main body 31.

Figure 3:
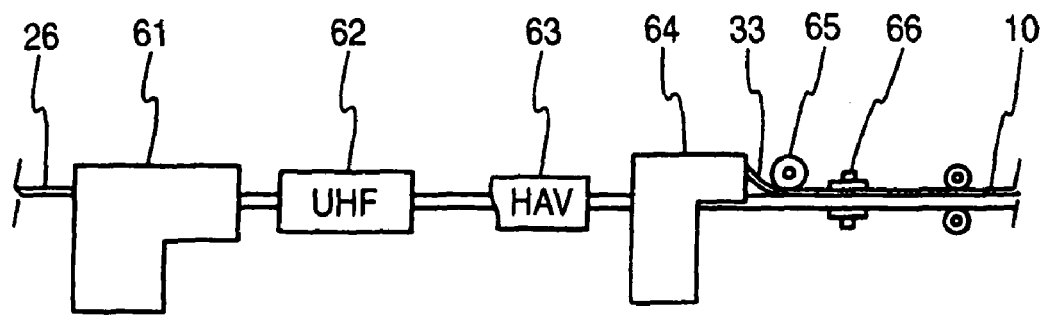
FIG. 3 is a conceptual diagram showing a process for producing the opening trim weather strip according to the embodiment of this invention.
Figure 4:
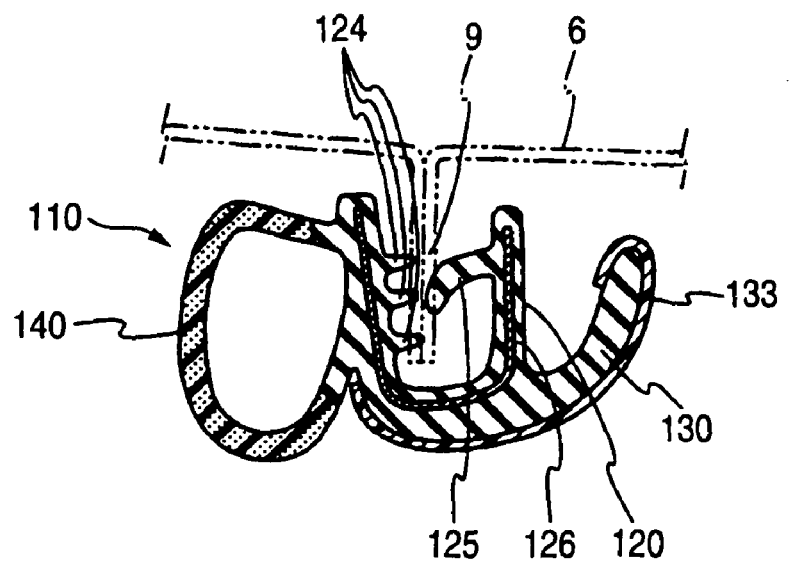
FIG. 4 is a diagram showing a sectional shape of a conventional opening trim weather strip.

After the surface layer 33 is extruded on the upper surface of the cover lip main body 31, the cover lip 30 and the surface layer 33 are sent to a pressure roller 65, so that the surface layer 33 is pressed against the cover lip main body 31 by the pressure roller 65 as shown in FIG. 3. In this case, a pattern may be formed on a surface of the surface layer 33.

Further, an end at a lateral part of the surface layer 33 is so folded as to be placed under a rear surface of the cover lip tip part 32 by using a bending roller 66, followed by press bonding the cover lip main body 31 and the surface layer 33 to each other.

The opening trim weather strip 10 fixed to the surface layer 33 is sent to a cooling bath (not shown) to be cooled by water or cold air.

The vulcanized and foamed integrally extruded material taken out from the cooling bath (not shown) is withdrawn by a withdrawing machine (not shown), so that the trim part 20 is bent to establish the substantially U-shaped section and cut in a predetermined size, followed by bonding of the terminal parts when so required, thereby giving the opening trim weather strip 10. Depending on a type of the opening trim weather strip 10, a double sided adhesive tape, a clip, and the like are attached to be a product.

What is claimed is:

1. An automobile weather strip to be attached to a rim of an opening of a vehicle body of an automobile for sealing between a vehicle body opening rim and a door, said automobile weather strip comprising:
   a trim part holding the weather strip to a flange part of the vehicle body opening rim or the door and having a substantially U-shaped section; and
   a sealing part formed integrally with an outer surface of the trim part for sealing by contacting to the door or the opening rim,
   wherein the trim part comprises an insert member and a covering material for covering the insert member and forms on an inner surface of the substantially U-shaped section a holding lip for holding the flange part, and
   wherein the covering material comprises a sponge material of a rubber comprising a blend material of an EPDM (ethylene propylene diene Monomer) rubber and an olefin-based thermoplastic synthetic resin, said covering material having physical properties of a specific gravity of 0.6 to 0.8 and a 25%-stretching stress of 500 KPa or more,
   wherein the sealing part comprises a sponge material of a rubber comprising the EPDM rubber not containing the olefin-based thermoplastic synthetic resin, and having physical properties of a specific gravity of 0.4 to 0.6 and a 25%-stretching stress of 200 KPa or less,
   wherein the olefin-based thermoplastic synthetic resin comprises ethylene/octane resin, and
   wherein the olefin-based thermoplastic synthetic resin has a specific gravity of 0.6 to 0.7.

2. The automobile weather strip according to claim 1, wherein the trim part comprises a cover lip that is formed integrally with the outer surface of the trim part as extending toward a car interior, and
   wherein the cover lip comprises the sponge material of the rubber that comprises the blend material of the EPDM rubber and the olefin-based thermoplastic synthetic resin.

3. The automobile weather strip according to claim 1, wherein the sealing part has a hollow shape.

4. The automobile weather strip according to claim 2, wherein an outer surface of the cover lip is covered with a solid material.

5. The automobile weather strip according to claim 3, wherein an outer surface of the sealing part is covered with a solid material.

6. The automobile weather strip according to claim 1, wherein the blend material comprises 12-20 parts by weight of the olefin-based thermoplastic synthetic resin with respect to 100 parts of the EPDM rubber.

7. The automobile weather strip according to claim 1, wherein the specific gravity of the sponge material of the covering material is about 0.7.

8. The automobile weather strip according to claim 1, wherein the olefin-based thermoplastic synthetic resin comprises polyethylene resin.

9. The automobile weather strip according to claim 1, wherein the olefin-based thermoplastic synthetic resin comprises polypropylene resin.

* * * * *